US009749533B2

(12) United States Patent
Takeuchi

(10) Patent No.: US 9,749,533 B2
(45) Date of Patent: Aug. 29, 2017

(54) IMAGE SHAKE CORRECTING DEVICE AND CONTROL METHOD THEREFOR, OPTICAL APPARATUS, AND IMAGE PICKUP APPARATUS

(71) Applicant: CANON KABUSHIKI KAISHA, Tokyo (JP)

(72) Inventor: Kenji Takeuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 129 days.

(21) Appl. No.: 14/557,689

(22) Filed: Dec. 2, 2014

(65) Prior Publication Data

US 2015/0172546 A1 Jun. 18, 2015

(30) Foreign Application Priority Data

Dec. 12, 2013 (JP) ................................ 2013-257050

(51) Int. Cl.
*H04N 5/228* (2006.01)
*H04N 5/232* (2006.01)
(Continued)

(52) U.S. Cl.
CPC ......... *H04N 5/23261* (2013.01); *G02B 7/023* (2013.01); *G02B 27/646* (2013.01); *H04N 5/23258* (2013.01); *H04N 5/23287* (2013.01)

(58) Field of Classification Search
CPC ........... H04N 5/23261; H04N 5/23258; H04N 5/23287; G02B 7/023; G02B 27/646
(Continued)

(56) References Cited

U.S. PATENT DOCUMENTS 7,590,336 B2 9/2009 Higo
7,983,547 B2 7/2011 Miyasako
(Continued)

FOREIGN PATENT DOCUMENTS

CN 101753845 A 6/2010
CN 102998874 A 3/2013
(Continued)

OTHER PUBLICATIONS

Dec. 12, 2016 Chinese Official Action in Chinese Patent Appln. No. 201410758373.5.

*Primary Examiner* — Tuan Ho
*Assistant Examiner* — Zhenzhen Wu
(74) *Attorney, Agent, or Firm* — Fitzpatrick, Cella, Harper & Scinto

(57) ABSTRACT

This image pickup apparatus performs feedback control so that a position of a shake correcting lens converges to a target position. A LPF and a subtracting unit divide a shake signal into low-frequency and high-frequency components. An adding unit combines each output of a high-frequency LPF and a low-frequency LPF and output the target position. A pan/tilt determination unit determines a panning speed from the shake signal. If the panning is fast, the target positions of the low-frequency and the high-frequency are controlled to converge to 0, and calculation for the target position of the high-frequency starts before that of the low-frequency at the end determination. If the panning is slow, only the target position of the low-frequency is controlled to converge to 0. The pan/tilt determination unit changes a determination condition for the detection depending on whether it is at the handheld photographing or the static state.

24 Claims, 12 Drawing Sheets

(51) Int. Cl.
*G02B 27/64* (2006.01)
*G02B 7/02* (2006.01)

(58) Field of Classification Search
USPC ....... 348/208.11, 208.7, 208.4, 208.5, 208.3, 348/208.99
See application file for complete search history.

(56) References Cited

U.S. PATENT DOCUMENTS

| | | | | |
|---|---|---|---|---|
| 8,175,448 | B2 | 5/2012 | Miyasako | |
| 8,190,009 | B2 | 5/2012 | Ibi | |
| 8,681,229 | B2 | 3/2014 | Nomura | |
| 9,191,575 | B2 | 11/2015 | Takeuchi | |
| 2004/0189815 | A1* | 9/2004 | Kumaki | G01C 19/5776 348/208.99 |
| 2005/0254805 | A1* | 11/2005 | Moriya | H04N 5/23287 396/53 |
| 2006/0083502 | A1 | 4/2006 | Higo | |
| 2007/0009242 | A1* | 1/2007 | Okada | G03B 17/00 396/52 |
| 2009/0021589 | A1* | 1/2009 | Okada | G03B 5/00 348/208.1 |
| 2009/0316010 | A1 | 12/2009 | Nomura | |
| 2010/0085436 | A1* | 4/2010 | Ohno | G03B 5/00 348/208.1 |
| 2010/0158493 | A1 | 6/2010 | Miyasako | |
| 2011/0102612 | A1* | 5/2011 | Iwata | G03B 5/00 348/208.11 |
| 2011/0158618 | A1 | 6/2011 | Ibi | |
| 2011/0234822 | A1 | 9/2011 | Miyasako | |
| 2013/0063615 | A1 | 3/2013 | Takeuchi | |
| 2013/0342714 | A1* | 12/2013 | Zhou | H04N 5/23267 348/208.2 |

FOREIGN PATENT DOCUMENTS

| | | | |
|---|---|---|---|
| JP | 2006-113264 | A | 4/2006 |
| JP | 2010-004370 | A | 1/2010 |
| JP | 2011-118073 | A | 6/2011 |
| JP | 2011-137982 | A | 7/2011 |

* cited by examiner

IMAGE SHAKE CORRECTING DEVICE AND CONTROL METHOD THEREFOR, OPTICAL APPARATUS, AND IMAGE PICKUP APPARATUS

BACKGROUND OF THE INVENTION

Field of the Invention

The present invention relates to a technique for correcting an image shake in an optical apparatus, an image pickup apparatus or the like.

Description of the Related Art

An image shake can be caused on an image captured by an image pickup apparatus such as a digital camera by a shaking of a user's hand which holds a camera main body when capturing the image. Therefore, there have been some apparatuses with a function for detecting vibration applied to the camera main body to correct the image shake of an object image. In this technique, optical image shake correction processing and electronic image shake correction processing are known. The optical image shake correction processing detects a shake of a camera main body with an angular velocity sensor or the like to move an optical member in a photographing optical system (a correcting lens) to change a direction of an optical axis in the photographing optical system. Thereby, the image focused in a light receiving plane of an imaging element can be moved to correct the shake. Also, the electronic image shake correction processing is processing for artificially correcting the image shake by performing an image processing on a captured image.

A shake detection signal output from the angular velocity sensor or the like comprises a signal caused by the vibration such as a hand shaking that should be corrected. In addition, the shake detection signal comprises a signal or the like caused by an operation of a camera depending on a photographer's purpose, such as a panning operation. Thereby, when the correcting lens is driven based on only the shake detection signal, an image shake correction is performed on a large shake, for example, during a panning or a tilting operation (hereinafter referred to as a "panning operation or the like"). Therefore, a target position of the correcting lens may be greater than a movable range thereof. Alternatively, an image swing (swing-back) can occur after the panning operation or the like to cause the user to feel discomfort about the operation of the camera or the image. A processing for correcting the swing-back stops the image shake correction if the shake detection signal of the angular velocity sensor is determined to be caused by the panning operation or the like. The correcting lens is returned to the center of the movable range (a reference position that has a no displacement) to be stopped.

In this connection, the shake detection signal may not be 0 exactly, but asymptotically close to 0 due to a residue signal or the like of a high-pass filter (HPF) or an integrator of a detection signal system when some rapid changes of the angle velocity signal occurs at the end of the panning operation or the like. Therefore, when the image shake correction is resumed, the correcting lens is moved a lot by the shake detection signal to cause the swing-back of the image. To solve the problem, Japanese Patent Laid-Open No. 2006-113264 discloses a device for correcting the image shake by gradually changing a cut-off frequency for a signal processing based filter of the angular velocity at the end of the panning operation or the like. Also, Japanese Patent Laid-Open No. 2011-118073 discloses a method for performing a drive of the correcting lens by speed control that depends on the angular velocity without using the HPF or a LPF (integrator) having an extremely lower cut-off frequency in the signal processing based filter of the angular velocity that results in the swing-back. Also, Japanese Patent Laid-Open No. 2010-004370 discloses a device for correcting a shake by the correcting lens based on a shake signal detected by the angular velocity sensor and correcting the shake by the electronic image shake correction based on the shake signal of the low-frequency components. Thereby, the device can ensure a sufficient drive range of the correcting lens to the large shake due to the panning operation or the like.

However, the technique described in Japanese Patent Laid-Open No. 2006-113264 has a weak effect on the image shake correction immediately after the panning operation or the like. Also, in the technique described in Japanese Patent Laid-Open No. 2011-118073, because the operation in which the position of the correcting lens is centered by position control, when exposure is not being performed, the effect of the image shake correction on low-pass components of the shake detection signal such as a swing of the user's body is weakened. Also, if the offset of the angular velocity sensor and the temperature fluctuation are large, the position of the correcting lens deviates from the center of the movable range since this technique does not use the HPF. If a crystal gyro sensor or the like with the little offset and temperature fluctuation is used, the cost may increase. Also, the technique described in Japanese Patent Laid-Open No. 2010-004370 reduces the performance of the image shake correction for the low-frequency during the exposure if the electronic image shake correction cannot be performed.

SUMMARY OF THE INVENTION

This invention provides an image shake correcting device enable to successfully correct an image shake if a large shake occurs even during the panning operation or the like.

According to the present embodiment, an image shake correcting device for correcting an image shake by a drive of a correcting unit is provided that includes a dividing unit configured to divide a detection signal output by a shake detecting unit into a plurality of frequency components; and a controlling unit configured to detect a speed of panning or tilting to change each cut-off frequency of a filter calculation or each intermediate value calculated by the filter calculation based on the detected speed to the divided plurality of frequency components respectively, and combine signals obtained by performing the filter calculation to generate a control signal of the correcting unit, if the panning or the tilting is determined from the detection signal.

The image shake correcting device according to the present invention can realize a better image shake correction if the large shake has occurred even during the panning operation or the like.

Further features of the present invention will become apparent from the following description of exemplary embodiments (with reference to the attached drawings).

DESCRIPTION OF THE EMBODIMENTS

Hereinafter, preferred embodiments of the present invention will be described with reference to the drawings. The present invention can be applied to an interchangeable lens mounted on a digital single-lens reflex camera, an optical apparatus such as a lens barrel, an image pickup apparatus such as a digital video camera, a monitoring camera, a Web camera, or the like, and electronic equipment including an image pickup apparatus, such as a mobile phone, a tablet terminal, or the like. Note that this invention does not intend to be limited to the following embodiments and illustrates only a concrete example that has some advantage in the practice of this invention. Also, all the combinations of the characteristic described in the following embodiments are not always essential to solve the problem of the present invention.

Figure 1:
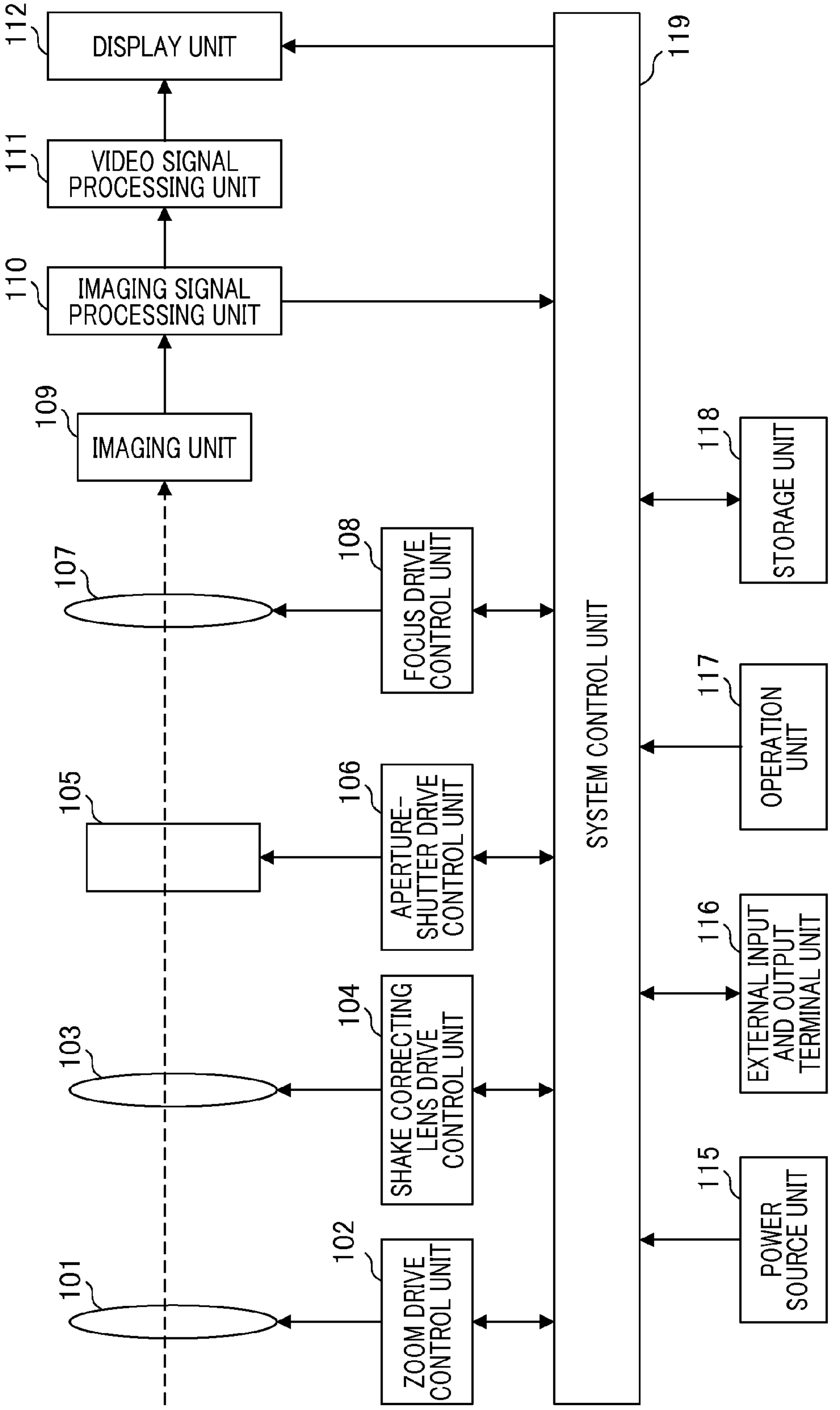
FIG. 1 is a block diagram illustrating an example of a functional configuration of an image pickup apparatus.

FIG. 1 is a block diagram illustrating an example of a functional configuration of an image pickup apparatus according to an embodiment of the present invention. A digital still camera is illustrated as the image pickup apparatus according to the present embodiment. However, a camera with a function of moving image photographing may be used.

A zoom unit 101 that constitutes a photographing optical system (focusing optical system) is a portion of a photographing lens device with variable magnification and comprises a zoom lens for changing the magnification of the photographing lens device. A zoom drive control unit 102 controls a drive of the zoom unit 101 according to an instruction of the control of a system control unit 119. A shake correcting lens (hereinafter referred to as a "correcting lens") 103 is an optical member that constitutes a portion of the photographing optical system serving as an image shake correcting member. The correcting lens 103 is a shift lens capable of moving in a direction different from an optical axis of the photographing optical system, for example, a direction perpendicular to the optical axis. A shake correcting lens drive control unit 104 drives the correcting lens 103 according to the instruction of the control of the system control unit 119.

An aperture-shutter unit 105 comprises a mechanical shutter with an aperture function. An aperture-shutter drive control unit 106 drives the aperture-shutter unit 105 according to the instructions for the control of the system control unit 119. A focus unit 107 is a portion of the photographing lens and comprises a focus lens capable of changing its position along the optical axis of the photographing lens. A focus drive control unit 108 drives the focus unit 107 according to the instructions for the control of the system control unit 119 to perform a focus-adjustment operation.

An imaging unit 109 comprises an imaging element such as a CCD (charge coupled device) image sensor and a CMOS (complementary metal oxide semiconductor) image sensor. The imaging element photoelectrically converts an optical image formed by the photographing optical system into an electric signal in pixel units. An imaging signal processing unit 110 performs A (analog)/D (digital) conversion, correlating double sampling, gamma correction, white balance correction, color interpolation processing and the like against the electric signal output by the imaging unit 109 to convert the electric signal output by the imaging unit 109 into a video signal. A video signal processing unit 111 processes the video signal output from the imaging signal processing unit 110 depending on the use. More specifically, the video signal processing unit 111 generates a video signal for display and performs an encoding process and a data filing for record.

A display unit 112 displays the image as necessary based on the video signal for display which the video signal processing unit 111 outputs. A power source unit 115 supplies the power source to the whole image pickup apparatus depending on the use. An external input and output terminal unit 116 is used to input and output a communication signal and the video signal between the external input and output terminal unit 116 and an external device. An operation unit 117 is used when the user operates the image pickup apparatus, and comprises a button, a switch or the like to provide an instruction to the image pickup apparatus. A storage unit 118 stores a variety of data such as video information. The system control unit 119 for controlling a camera system comprises a CPU (Central Processing Unit), a ROM (Read Only Memory), a RAM (Random Access Memory), and the like. The control unit 119 develops the control program stored in the ROM to the RAM to carry out the instructions in the CPU. Thereby, each unit of the image pickup apparatus can be controlled to realize the variety of operations described as below.

The operation unit 117 comprises a release switch configured to turn "ON" a first switch (referred to a SW1) and a second switch (referred to a SW2) in turn depending on the pressing amount of a release button. The SW1 turns "ON", when the release button is half-pressed, and the SW2 turns "ON", when the release button is fully-pressed. When the SW1 turns "ON", the system control unit 119 controls the focus drive control unit 108 to adjust the focus based on an AF (auto focus) evaluation value. The AF evaluation value is, for example, generated based on the video signal for display output to the display unit 112 by the video signal processing unit 111.

The system control unit 119 obtains information about brightness of the video signal and performs AE (automatic exposure) processing, for example, determining an aperture value and a shutter speed to obtain an appropriate exposure amount based on a predetermined program diagram. When the SW2 is turned "ON", the system control unit 119 performs photographing at the determined aperture and shutter speed, and controls the image data obtained by the imaging unit 109 to store the data to the storage unit 118 and the like.

The operation unit 117 comprises an image shake correction switch for selecting an image shake correction mode. If the image shake correction mode is selected by the operation of the image shake correction switch, the system control unit 119 provides instructions for an operation of the shake correction to the shake correcting lens drive control unit 104.

The instructed shake correcting lens drive control unit 104 continues the operation of the shake correction until the instruction of "the image shake correction-OFF" is issued. Also, the operation unit 117 comprises a mode select switch for selecting a still image photographing mode, a moving image photographing mode or the like. The operation unit 117 can change the operation condition of the shake correcting lens drive control unit 104 at each selected photographing mode. The operation unit 117 also comprises a play-mode select switch for selecting a play-mode and stops the operation of the shake correction at the play-mode. The operation unit 117 comprises a magnification change switch for performing the instruction for the change of the zoom magnification. When the instruction for the change of the zoom magnification is performed by the operation of the magnification change switch, the zoom drive control unit 102 that has received the instruction via the system control unit 119 drives the zoom unit 101 to move the zoom lens to the instructed position to vary the magnification.

Figure 2A:
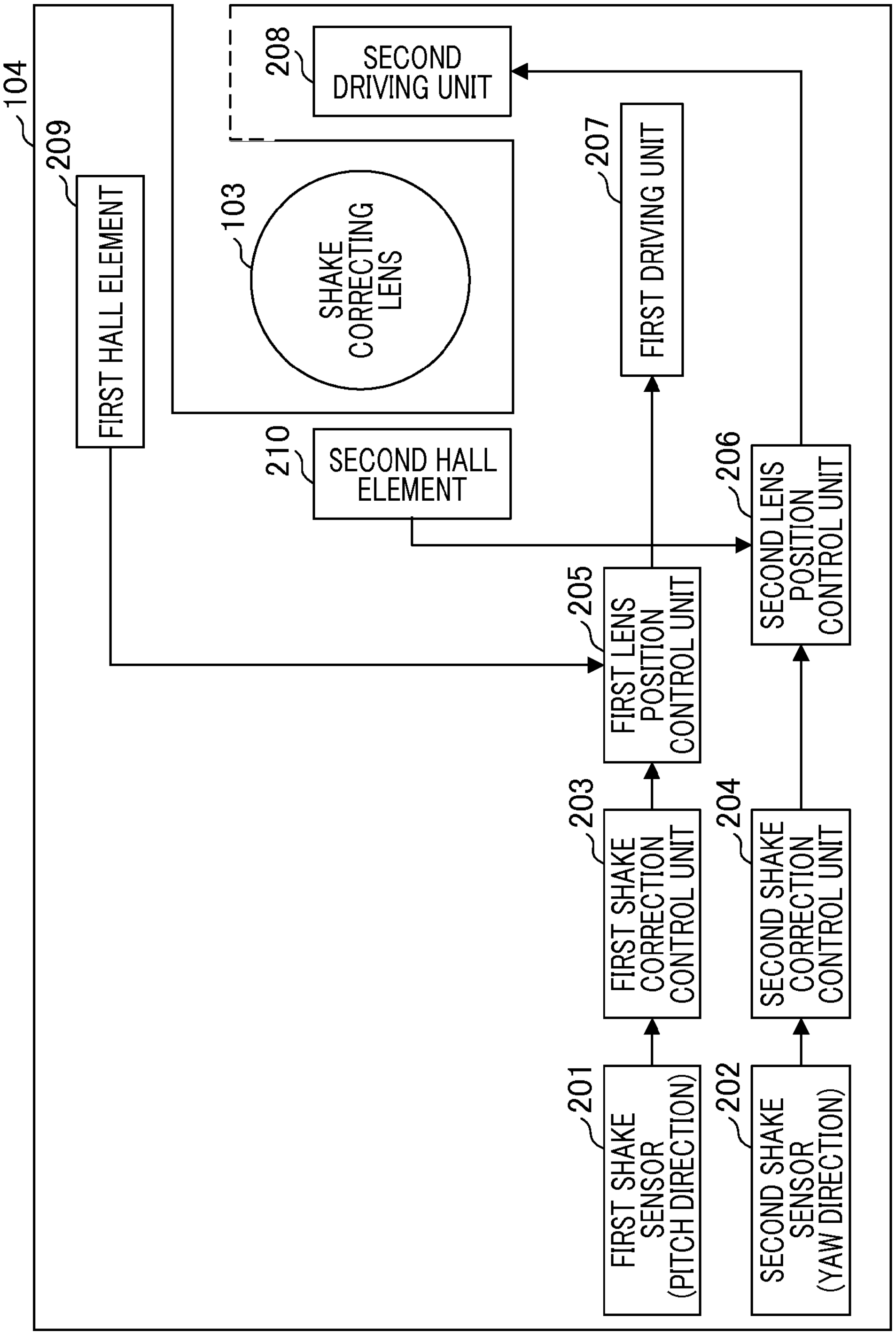
FIG. 2A is a block diagram illustrating an exemplary configuration of a shake correcting lens drive unit.

Next, a description will be given of a configuration of the shake correcting lens drive control unit 104 referring to FIG. 2A. FIG. 2A is a block diagram illustrating an example of a functional configuration of the shake correcting lens drive unit 104. A shake detection unit comprises a first shake sensor 201 and a second shake sensor 202 to detect each shake in a plurality of directions.

The first shake sensor 201 is, for example, an angular velocity sensor and detects a shake in a direction perpendicular to the image pickup apparatus (pitch direction) in a natural attitude (a reference attitude whose longitudinal direction of the image closely matches to the horizontal direction). The first shake sensor 201 outputs a shake detection signal to a first shake correction control unit 203. The second shake sensor 202 is, for example, an angular velocity sensor and detects a shake in a direction parallel to the image pickup apparatus (yaw direction) in a natural attitude. The second shake sensor 202 outputs the shake detection signal to a second shake correction control unit 204.

The first and second shake correction control units 203, 204 determine target positions of the correcting lens 103 in the pitch direction and the yaw direction relatively to output correction position control signals regarding the target position to control a drive of the correcting lens 103. The first shake correction control unit 203 outputs the correction position control signal to a first lens position control unit 205, and the second shake correction control unit 204 outputs the correction position control signal to a second lens position control unit 206.

The first lens position control unit 205 performs a drive-control of a first driving unit 207 comprising, for example, an actuator, by feedback control. This feedback control is carried out based on the correction position control signal in the pitch direction from the first shake correction control unit 203 and a position detection signal described as below. Also, the second lens position control unit 206 performs a drive-control of a second driving unit 208 comprising the actuator by feedback control. This feedback control is carried out based on the correction position control signal in the yaw direction from the second shake correction control unit 204 and the position detection signal described as below.

A position detection unit of the correcting lens 103 comprises a first Hall element and a second Hall element 210 to obtain position information corresponding to the two directions. The first Hall element 209 detects the position of the correcting lens 103 in the pitch direction to output the detected position information to the first lens position control unit 205. Also, the second Hall element 210 detects the position of the correcting lens 103 in the yaw direction to output the detected position information to the second lens position control unit 206.

Next, a description will be given of a drive control of the correcting lens 103 performed by the shake correcting lens drive control unit 104. The first and second shake correction control units 203 and 204 obtain the shake detection signals (angular velocity signals) representing the shaking of the image pickup apparatus in the pitch direction and the yaw direction respectively. The first and second shake correction control units 203 and 204 generate the correction position control signals for driving the correcting lens 103 in the pitch direction and the yaw direction based on the shake detection signals to output those signals to the first and second lens position control units 205 and 206 respectively.

The first Hall element 209 and the second Hall element 210 output voltage signals depending on magnetic field strength by magnets provided in a unit comprising the correcting lens 103 as the position information of the correcting lens 103 in the pitch direction and the yaw direction. Each type of the position information is output to the first and the second lens position control units 205 and 206 respectively. The first and the second lens position control units 205 and 206 perform the drive-control of the first driving unit 207 and the second driving unit 208 respectively. In other words, each signal value of the first Hall element 209 and the second Hall element 210 represents the position of the correcting lens 103. The feedback control can be realized such that each signal value is caused to converge to a correction position control signal value (representing the target position of the correcting lens 103) from the first and the second shake correction control units 203 and 204 respectively. Note that the position signal values output from the first Hall element 209 and the second Hall element 210 are variable. Therefore, the outputs of the first Hall element 209 and the second Hall element 210 are adjusted such that the correcting lens 103 moves to the predetermined position with respect to the correction position control signals.

The first and second shake correction control units 203 and 204 respectively output the correction position control signals for moving the position of the correcting lens 103 to cancel the image shake based on the shake detection information from the first and second shake sensors 201 and 202. For example, the first and second shake correction control units 203 and 204 generate the control signals of the speed or the position of the correction from the angular velocity signal having the shake detection information or the signal for performing the filter processing to the angular velocity signal.

By the above operation, if vibration such as hand shaking is applied to the image pickup apparatus at photographing, the image shake can be corrected to a certain level of vibration. Also, the first and second shake correction control units 203 and 204 detect a shake state of the image pickup apparatus based on the detection information of the first and second shake sensors 201 and 202, and the outputs of the first and second Hall elements 209 and 210 to perform a control of panning (or tilting).

Figure 3:
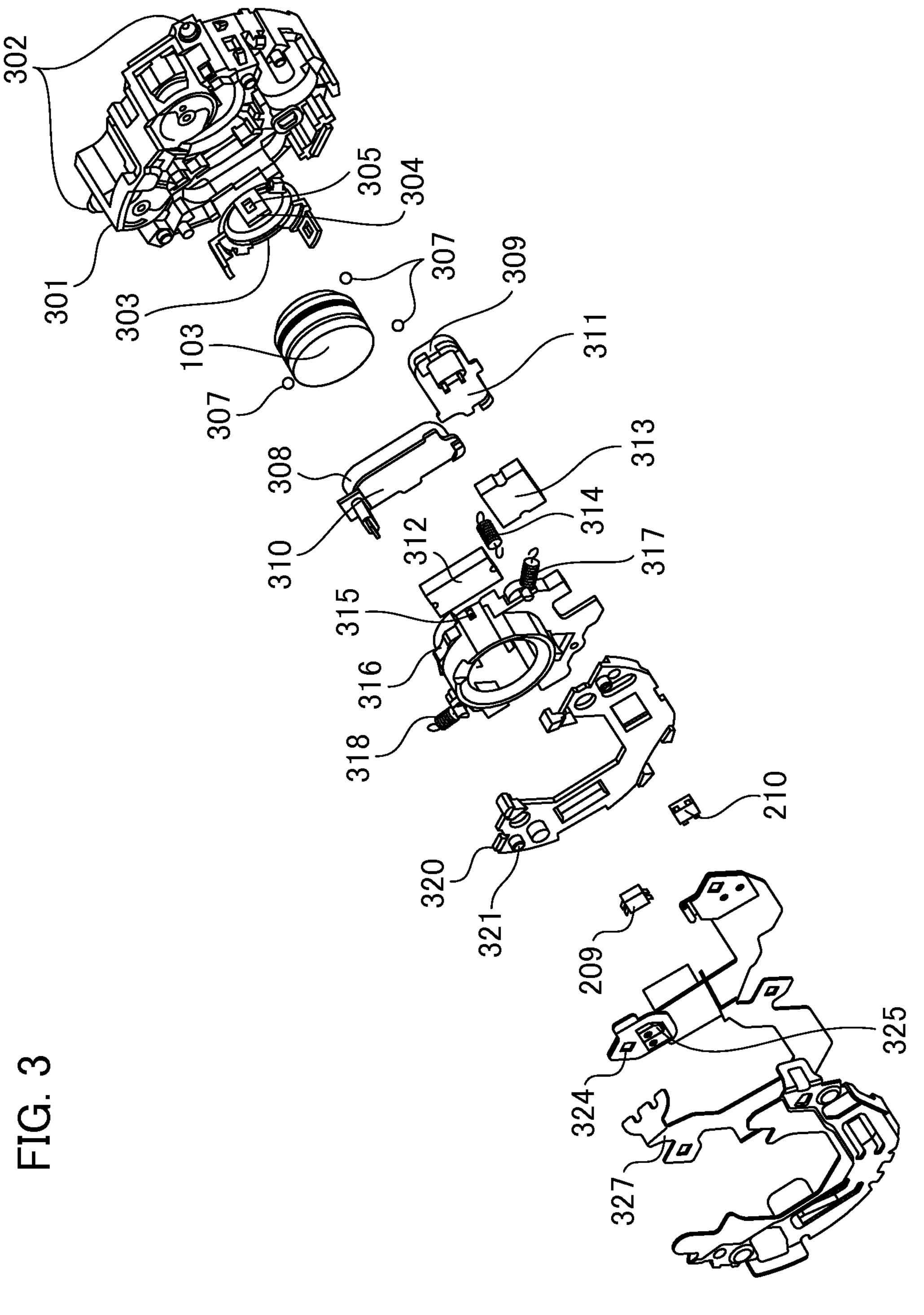
FIG. 3 is an exploded perspective view illustrating an exemplary configuration of a shake correcting mechanism unit.

Next, a description will be given of a shake correcting mechanism unit referred to FIG. 3. FIG. 3 is an exploded perspective view illustrating an exemplary configuration of the concrete shake correcting mechanism unit. The shake correcting mechanism unit comprises a correcting lens 103, a shake correcting lens drive control unit 104, an aperture-shutter unit 105, and an aperture-shutter drive control unit 106.

A base 301 is a base of the shake correcting mechanism unit and is fixed to the aperture-shutter unit 105 and a ND (Neutral Density) filter mechanism. The base 301 is provided together with two follower pins 302 and a movable follower pin (not shown). Three cam grooves in a cam cylinder (not shown) disposed outward in a radial direction of the base 301 are configured to fit with these follower pins, and advance and return in a direction of the optical axis along the cam grooves.

The correcting lens 103 is held by a holder 316 by a caulking pawl (not shown). A lens cover 303 comprises an opening for limiting the light flux passed through the correcting lens 103. The lens cover 303 comprises three arm units 304 at the side thereof. The arm units 304 comprise openings 305 and fit at three locations at the projections 315 provided at the side of the holder 316 to hold the lens cover 303 to the holder 316 integrally. The holder 316 integrally holds magnets 312 and 313.

The holder 316 is pressure welded to the base 301 through three balls 307 and is rolling supported by the balls 307 to allow the holder to be movable in any direction in a plane perpendicular to the optical axis. The configuration for holding the holder 316 by the balls 307 can realize a more rapid movement with less amplitude than a configuration for guiding the holder by a guide bar. Therefore, this invention can provide an image shake correction with the excellent image shake correction even in the image pickup apparatus having an imaging element with a large number of pixels.

One end of a thrust spring 314 is engaged to the projection 315 of the holder 316 and the other end thereof is engaged to a projection (not shown) provided in the base 301. The thrust spring 314 is held in the extended state and urges the holder 316 to the base 301. Radial springs 317 and 318 have a role of preventing rotation of the holder 316. Bobbins 317 and 318 made of resins are configured together with pins made of metals and are attached to the end of coils 308 and 309. A land of a flexible printed circuit (FPC) 324 is electrically connected to the pins of the bobbins 310 and 311 by soldering or the like to form an electric power supplied circuit to coils 308 and 309.

A first Hall element 209 and a second Hall element 210 are provided close to the magnets 312 and 313 and detect the magnetic fields generated by the magnets 312 and 313 respectively. The first Hall element 209 and a second Hall element 210 are mounted on the FPC 324 to supply the electric power therethrough. A FPC 327 forms a circuit that supplies the electric power to the aperture-shutter unit 105 and the ND filer drive unit. The FPC 324 and 327 are fixed to the holder 320 by a projection 321.

Next, a description will be given of configurations inside of the first shake correction control unit 203 and the first lens position control unit 205 referred to FIG. 2B and FIG. 4. Note that the second shake correction control unit 204 and the second lens position control unit 206 have configurations similar to those and thus, a description thereof will be omitted.

Figure 2B:
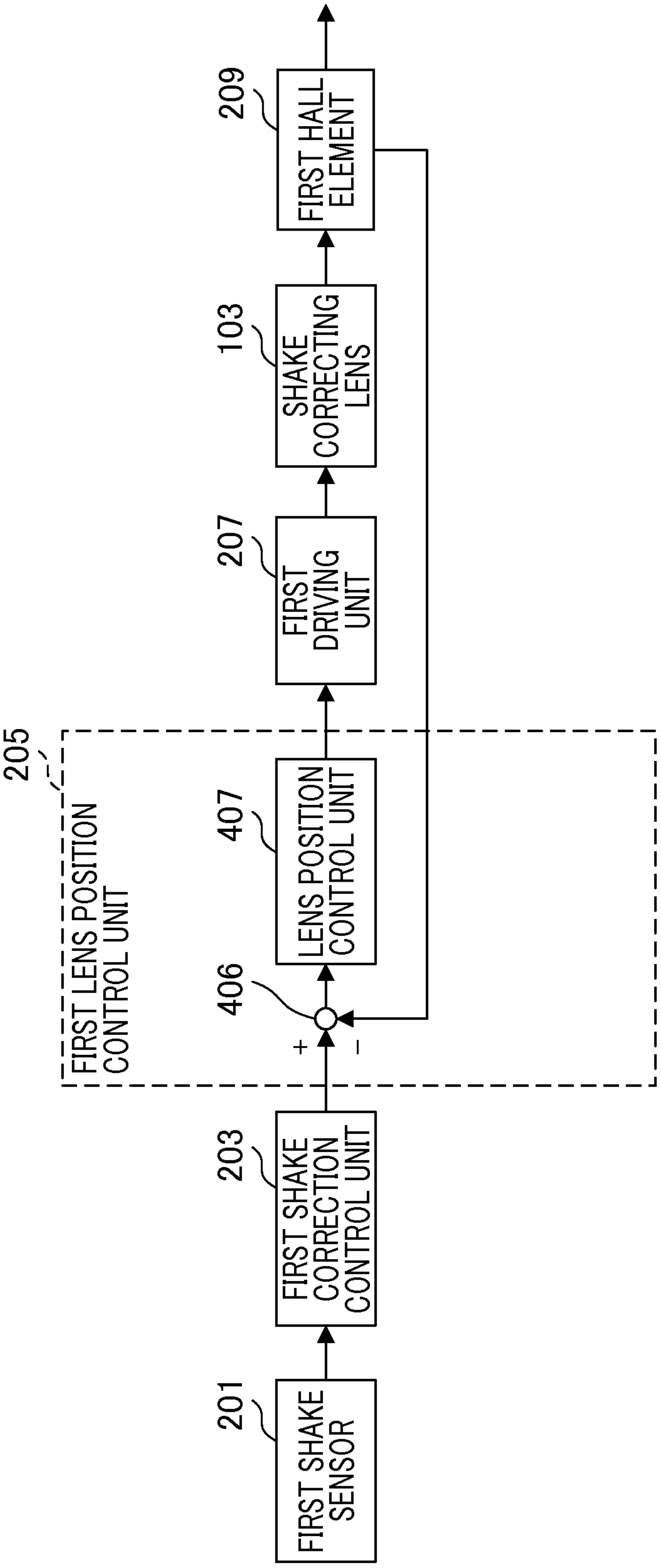
FIG. 2B is a block diagram illustrating exemplary configurations inside of a shake correction control unit and a lens position control unit.

In FIG. 2B, the first shake sensor 201 serving as the shake detecting unit detects a shake applied to the image pickup apparatus and outputs a shake signal (angular velocity signal) depending on the shake. The shake signal is processed in the first shake correction control unit 203 and outputs the signal to a subtracting unit 406. The configuration of the first shake correction control unit 203 is described as below by using FIG. 4.

The subtracting unit 406 subtracts a position detection signal by the first Hall element 209 from the signal generated by the first shake correction control unit 203 and outputs a signal of the target position of the correcting lens to a lens position control unit 407. The lens position control unit 407 comprises a control arithmetic device and performs, for example, calculations for P (proportion) control, I (integration) control, and D (differentiation) control by a PID controller. The lens position control unit 407 outputs a drive signal of the correcting lens 103 to the first driving unit 207. The image shake correction is carried out according to the feedback control of the position information detected by the first Hall element 209 to the target position of the correcting lens.

Figure 4:
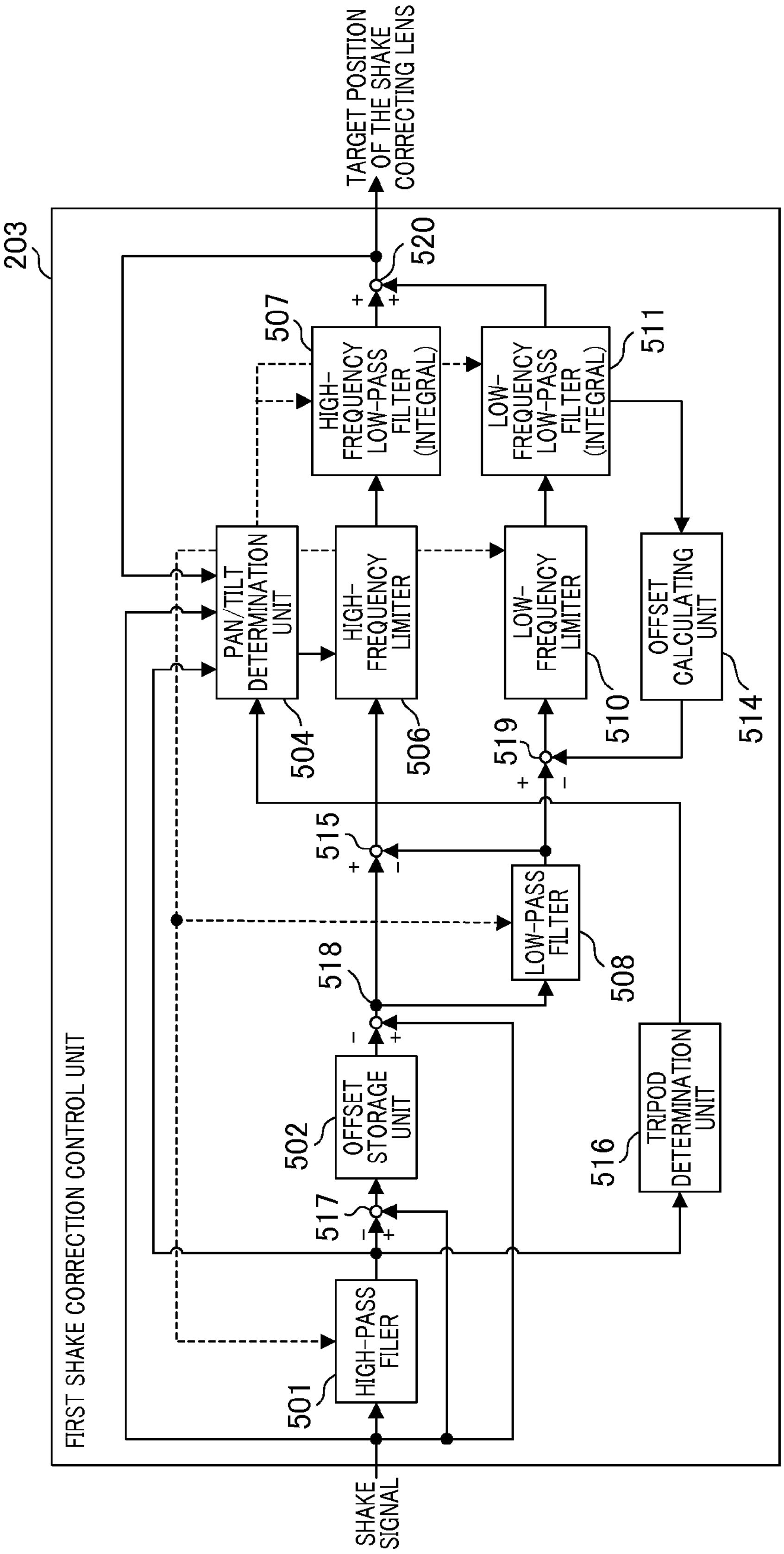
FIG. 4 is a block diagram illustrating an exemplary configuration inside of a shake correction control unit.

FIG. 4 is a block diagram illustrating an exemplary configuration of the first shake correction control unit 203. A high-pass filer (hereinafter referred to as a “HPF”) is a digital filter for removing offset components of a relatively low-frequency from the shake signal output from the first shake sensor 201, and can change the cut-off frequency thereof. The shake signal from which the offset components have been removed by the HPF 501 is subtracted from the shake signal before removing the offset components to extract the offset components of the shake signal in a subtracting unit 517. The extracted offset components of the shake signal are held in an offset storage unit 502.

The output of the offset storage unit 502 is subtracted from the shake signal output from the first shake sensor 201 to calculate the shake signal from which the offset components have been removed in a subtracting unit 518. In the present embodiment, an input to the offset storage unit 502 is calculated previously and then, the updating of the offset value held in the offset storage unit 502 is stopped while starting the control. After that, the fixed offset value is removed from the shake signal without using the HPF 501. The shake signal removing the offset value is output to a subtracting unit 515 and a low-pass filter (hereinafter referred to as a “LPF”) 508.

The LPF 508 is a filter in which the converging time constant of the filter calculation is variable, and extracts low-frequency components of the shake signal. In addition, the subtracting unit 515 can subtract the low-frequency components of the shake signal extracted by the LPF 508 from the shake signal after removing the offset to obtain high-frequency components of the shake signal. In other words, in the present embodiment, a dividing unit is configured to divide the shake signal into low-frequency components and high-frequency components. The shake signal of the low-frequency components (hereinafter referred to as a “low-frequency shake signal”) is output from the LPF 508 to a subtracting unit 519.

The shake signal of the high-frequency components (hereinafter referred to as a “high-frequency shake signal”) is output from the subtracting unit 515 to a high-frequency limiter 506. The high-frequency shake signal is limited by the high-frequency limiter 506. In other words, the signal level is limited to prevent the input of the large shake signal greater than or equal to a predetermined value to a high-frequency LPF 507. The output of the high-frequency limiter 506 is integrated with the high-frequency LPF 507 capable of changing the cut-off frequency. The high-frequency LPF 507 for integrating the high-frequency shake signal (first low-pass filter) has a variable converging time constant of the filter calculation. The integration converts angular velocity information into angular information to generate a shake angle signal extracted only the high-frequency components.

In contrast, the subtracting unit 519 subtracts the offset value calculated by an offset calculating unit 514 from the low-frequency shake signal extracted by a LPF 508 (third low-pass filter). The low-frequency shake signal after the subtracting of the offset is limited by a low-frequency limiter 510 and further integrated with a low-frequency LPF 511 (second low-pass filter). The low-frequency LPF 511 has variable cut-off frequency and generates a shake angle signal in which only the low-frequency components are extracted. The low-frequency LPF 511 for integrating the low-frequency components has a variable converging time constant of the filter calculation.

The offset calculating unit 514 calculates the offset value from the output of the low-frequency LPF 511. If a stationary offset component in a state that the shake does not occur to the low-frequency shake signal divided by the LPF 508 is applied, an offset value for subtracting is calculated such that the offset components is 0 at an input end of the low-frequency limiter 510. The above processing can prevent the correcting lens 103 from being driven out of the range in which the correcting lens can be controlled due to the monotonic increase of the low-frequency shake angle signal integrated by the low-frequency LPF 511. Each output of the high-frequency LPF 507 and the low-frequency LPF 511 is added in an adding unit 520 to output the result as a target position of the correcting lens.

A pan/tilt determination unit 504 determines whether it is panning or the tilting state by using the shake signal, the output of the HPF 501, the output of the adding unit 520, and the determination result of a tripod determination unit 516. The pan/tilt determination unit 504 determines that it is the panning operation or the tilting operation in the following cases:

(1) if the image pickup apparatus has the shake signal or the shake signal after removing the offset by the HPF 501 larger than a predetermined determination reference value (threshold value) when the large shake is applied thereto;

(2) if the position of the correcting lens 103 is more spaced apart from a center position of the movable range relative to the predetermined value; and (3) if only one axis is determined to be in a tripod state.

The determination of condition (1) sets the value of cut-off frequency of the HPF 501 to be high. Also, in the high-frequency LPF 507 and the low-frequency LPF 511, the determination of condition (2) sets the value of the cut-off frequency to be high. Also, the determination of condition (3) uses the determination result by the tripod determination unit 516. The tripod determination unit 516 performs state determination processing that determines whether or not the image pickup apparatus is in a static state provided on a supporting member such as a tripod. For example, the tripod determination unit 516 detects an output signal of the HPF 501 less than or equal to the predetermined value during a predetermined period to detect the state that the camera is fixed to the tripod. Also, the tripod determination unit 516 detects the output signal of the HPF 501 greater than or equal to the predetermined value during the predetermined period to determine the state for the release of the tripod.

In the detection of the tripod state, a pitch direction and a yaw direction with respect to a regular position of the image pickup apparatus are determined separately. If either the pitch direction or the yaw direction of the tripod state is detected, the pan/tilt determination unit 504 determines that it is the panning operation or the tilting operation. In this case, the pan/tilt determination unit 504 limits the input with the high-frequency limiter 506 and the low-frequency limiter 510. When the above operation is done, the predetermined value is added or subtracted depending on the determination result of the condition (1) to an intermediate value for the filter of the LPF 508, the high-frequency LPF 507, and the low-frequency LPF 511. Thereby, the processing for converging the intermediate value to 0 is performed.

Figure 10:
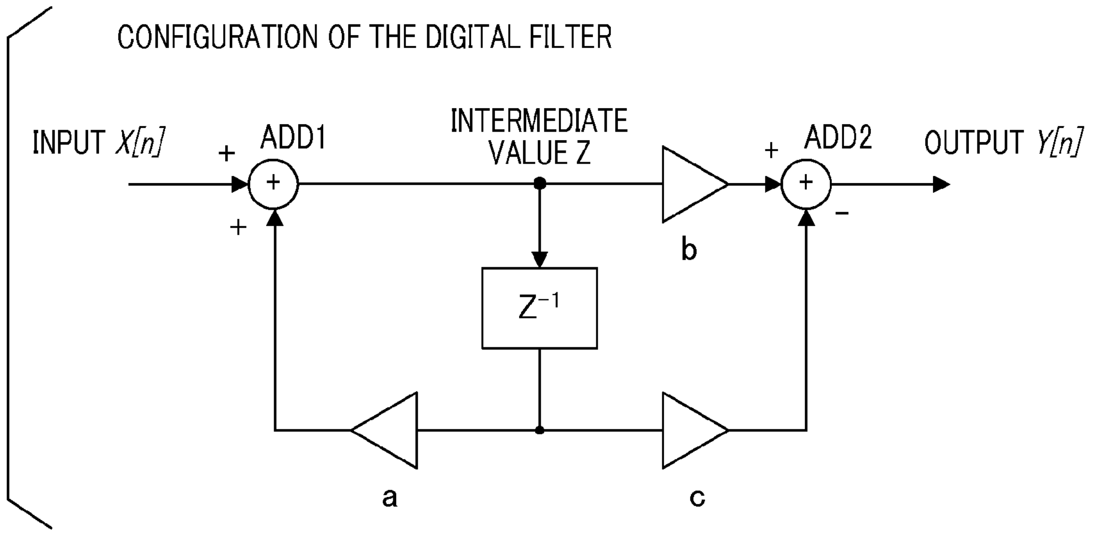
FIG. 10 is a block diagram illustrating an exemplary configuration of a recursive digital filter.

FIG. 10 illustrates a block diagram illustrating a configuration of a recursive primary digital filter. For example, an exemplary configuration consists of adding units ADD1 and ADD2, gain units (multiplication units) a, b, c, and a delay unit (temporary storage unit) Z−1. A time of a sampling is denoted by n and a input value at this sampling is set to X[n] and an intermediate value at the previous sampling is set to Z[n−1]. An intermediate value at this sampling is set to Z[n]. The input value X[n] and the output of the gain unit a is added in the adding unit ADD1 to calculate the intermediate value Z[n] and store it in the delay unit Z−1.

The intermediate value that is the stored value in the filter calculation is output to the adding unit ADD2 through the gain unit b. The adding unit ADD2 adds a negative output of the gain unit c to the output of the gain unit b. This output of the gain unit c is an output of the signal multiplying a gain factor by the previous intermediate value Z[n−1]. Thereby, an output value Y[n] at this sampling is calculated from the intermediate value Z[n] at this sampling and the intermediate value Z[n−1] at the previous sampling. In the present embodiment, the constants of each gain unit that determine the gain and phase characteristic at the frequency of the digital filter (gain factor) denoted by a, b, and c.

A method for reducing the intermediate value directly is less dependent on the set time constant of the cutoff frequency relative to the method for changing the cutoff frequency of the digital filter to the side of the high frequency. Therefore, the method has advantages that can control the speed for converging the intermediate value to converge 0 and reduce a swing-back with respect to the output of the filter after the end of the pan/tilt processing. This processing can prevent the correcting lens 103 from driving greater than or equal to the movable range even if the large shake is applied to the image pickup apparatus. Also, the processing can prevent the photographing image from being unstable due to the swing-back immediately after the panning operation.

The shake angle signals of the low-frequency and the high-frequency as generated above are combined to input a target position signal of the correcting lens 103 to the lens position control unit 407. The lens position control unit 407 performs the operation of the image shake correction by the feedback control based on the target position of the correcting lens and the position information detected by the Hall element 209.

Next, a description will be given of a change of a method for calculating the target position of the correcting lens depending on the speed of the panning (or tilting) or the static state of the image pickup apparatus. In the present embodiment, the pan/tilt determination unit 504 compares the working speed of the panning operation or the like purposely performed by the photographer to a threshold value. The pan/tilt determination unit 504 respectively detects two types of the cases that are distinguished from whether the working speed is fast or slow to change the processing for calculating the image shake correcting amounts of the low-frequency and the high-frequency depending on each case.

Figure 7:
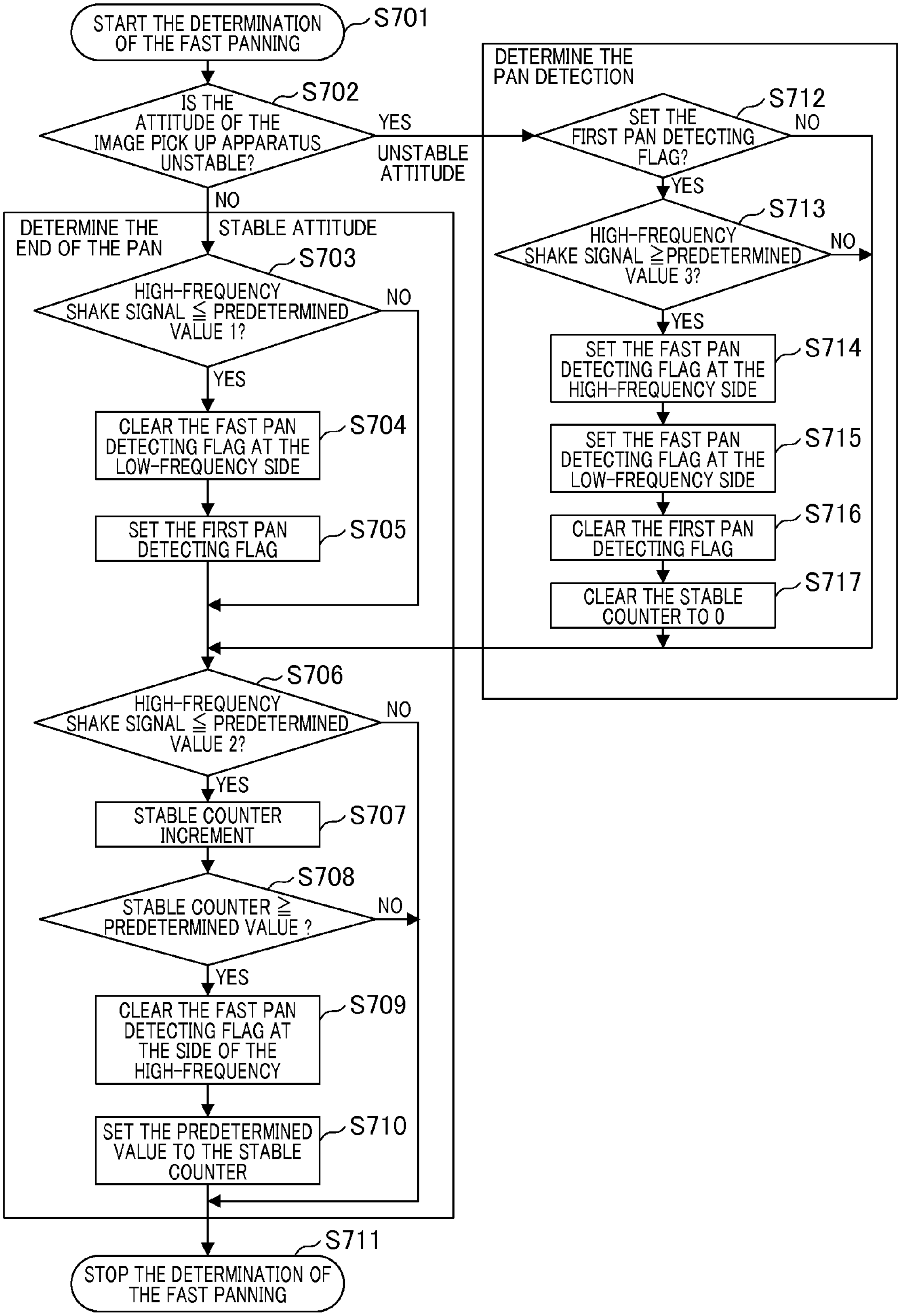
FIG. 7 is a flow chart illustrating an exemplary processing for detecting a fast panning.

Referring to a flow chart of FIG. 7, a description will be given of a method for detecting the panning if the working speed of the panning operation or the like is fast. The pan/tilt determination unit 504 performs the processing that determines the detection of the panning that the same processing at a constant period carries out on a first axis and a second axis separately.

Firstly, when the processing for determining the fast panning is started (S701), it is determined whether or not an attitude of the image pickup apparatus is at an unstable state due to the panning or the like by using the shake information and the determination reference value (S702). The pan/tilt determination unit 504 proceeds to S712 and performs the processing for determining the detection of the pan, if the attitude of the image pickup apparatus is determined to be in the unstable state. Also, the processing proceeds to S703 if the image pickup apparatus is determined to be in the stable state.

To explain starting from the processing for determining the detection of the pan, it is determined whether a first flag (hereinafter referred to as a "first pan detecting flag") is set or not. The first pan detecting flag is a flag for preventing a plurality of sets from the setting of a second flag for detecting the panning (hereinafter referred to as a "pan detecting flag") until it is cleared. If the first pan detecting flag is not set, the processing proceeds to S706. Also, if the first pan detecting flag is set, the processing proceeds to S713. In S713, the level of the high-frequency shake signal is compared to a third threshold value (referred to as a "predetermined value 3"). If the level of the high-frequency shake signal is greater than or equal to the predetermined value 3, the processing proceeds to S712. However, if the level of the high-frequency shake signal is less than the predetermined value 3, it is determined not to be panning, the processing proceeds to S706.

In S714, a fast pan detecting flag for the high-frequency (third flag) is set. Next, in S715, a fast pan detecting flag for the low-frequency (fourth flag) is set, and the first pan detecting flag is further cleared in S716. And then, a value of a stable counter is cleared to (S717). The term "stable counter" is a counter variable for determining whether or not the shake amount of the image pickup apparatus is small during the predetermined period, and is used in S708. After S717, the step proceeds to S706 (a processing for determining the clear of the fast pan flag for the high-frequency).

On the other hand, if the attitude of the image pickup apparatus is determined to be stable in S702, the processing proceeds to S703 and performs processing for determining the end of the pan detection. In S703, the high-frequency shake signal is compared to a first threshold value (referred to a "predetermined value 1"). If the high-frequency shake signal is less than or equal to the predetermined value 1, the processing proceeds to S704, however it is determined to be in the panning state and the processing proceeds to S706 if the signal exceeds the predetermined value 1.

In S704, it is determined that the panning is complete and the fast pan detecting flag for the low-frequency is cleared. Then, the first pan detecting flag is set (S705) to prepare for the case if the panning is redetected. Next, in S706, the high-frequency shake signal is compared to a second threshold value (referred to a "predetermined value 2"). If the high-frequency shake signal exceeds the predetermined value 2, it is determined to be in the panning state and the processing stops the determination of the fast panning (S711).

Also, if the high-frequency shake signal is less than or equal to the predetermined value 2, the processing proceeds to S707 since it satisfies the condition of the stop of the panning. The value of the stable counter is incremented by 1. Next, the value of the stable counter is compared to the predetermined value (threshold value) (S708). If the value of the stable counter is determined to be greater than or equal to the predetermined value, the processing proceeds to S709, however, if the value is less than the predetermined value, it is determined not to have completed the panning and proceeds to S711.

If the value of the stable counter is greater than or equal to the predetermined value in S708, the shake state is determined to be small during the predetermined time and that the panning has completed. In this case, the fast pan detecting flag for the high-frequency is cleared (S709), and the predetermined value is set to the stable counter (S710). Then the fast panning determination is stopped (S711).

Accordingly, a separate determination for detecting the pan and the determination for detecting the end of the pan are carried out on the calculation of the shake target value of the low-frequency and that of the high-frequency in the correcting lens 103. Note that those determinations for the fast tilting are also performed as described above.

Figure 9:
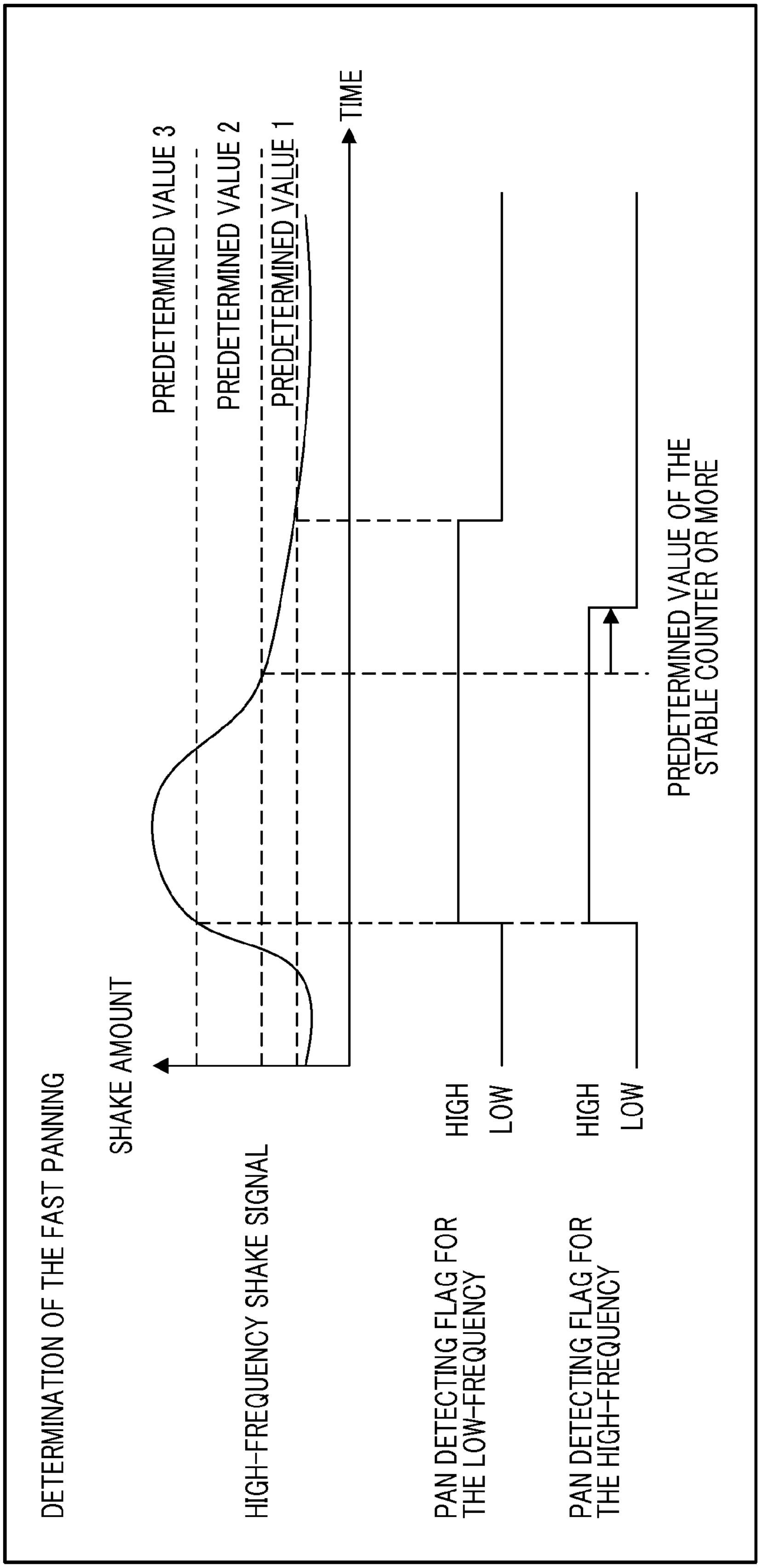
FIG. 9 is a diagram illustrating a timing of a determination flag for detecting a fast panning.

FIG. 9 illustrates a timing chart illustrating the fast panning determination. The time variation of the high-frequency shake signal and the timing of the set and the clear on each pan detecting flag for the low-frequency and the high-frequency are illustrated. FIG. 9 illustrates an example in which the shake amount increases and exceeds the predetermined value 1, 2, and 3 in turn, and then, arrives at a peak value, and decreases gradually. The relationship between the predetermined value 3 for performing the panning detection, the predetermined value 1 for performing the determination of the end of the panning for the low-frequency, and the predetermined value 2 for performing the determination of the end of the panning for the high-frequency is set to "the predetermined value 3> the predetermined value 2> the predetermined value 1".

Each pan detecting flag is set at the time point when the shake amount of the high-frequency shake signal arrives at the predetermined value 3. In other words, the panning determination of the high-frequency has the same timing as that of the low-frequency. However, the pan detecting flag for the low-frequency (fourth flag) is cleared at the time point when the shake amount of the high-frequency shake signal is reduced to arrive at the predetermined value 1. Also, the pan detecting flag for the high-frequency (third flag) is cleared at the time point when the shake amount of the high-frequency shake signal is reduced to arrive at the predetermined value 2. The determination for the end of the panning in the pan detecting flag for the high-frequency is determined at the earlier timing than that for the low-frequency. The pan detecting flag for the low-frequency is determined at the delayed timing when the shake signal becomes sufficiently small. Therefore, the timing that determines the end of the panning for the low-frequency is different from that for the high-frequency.

Figure 8A:
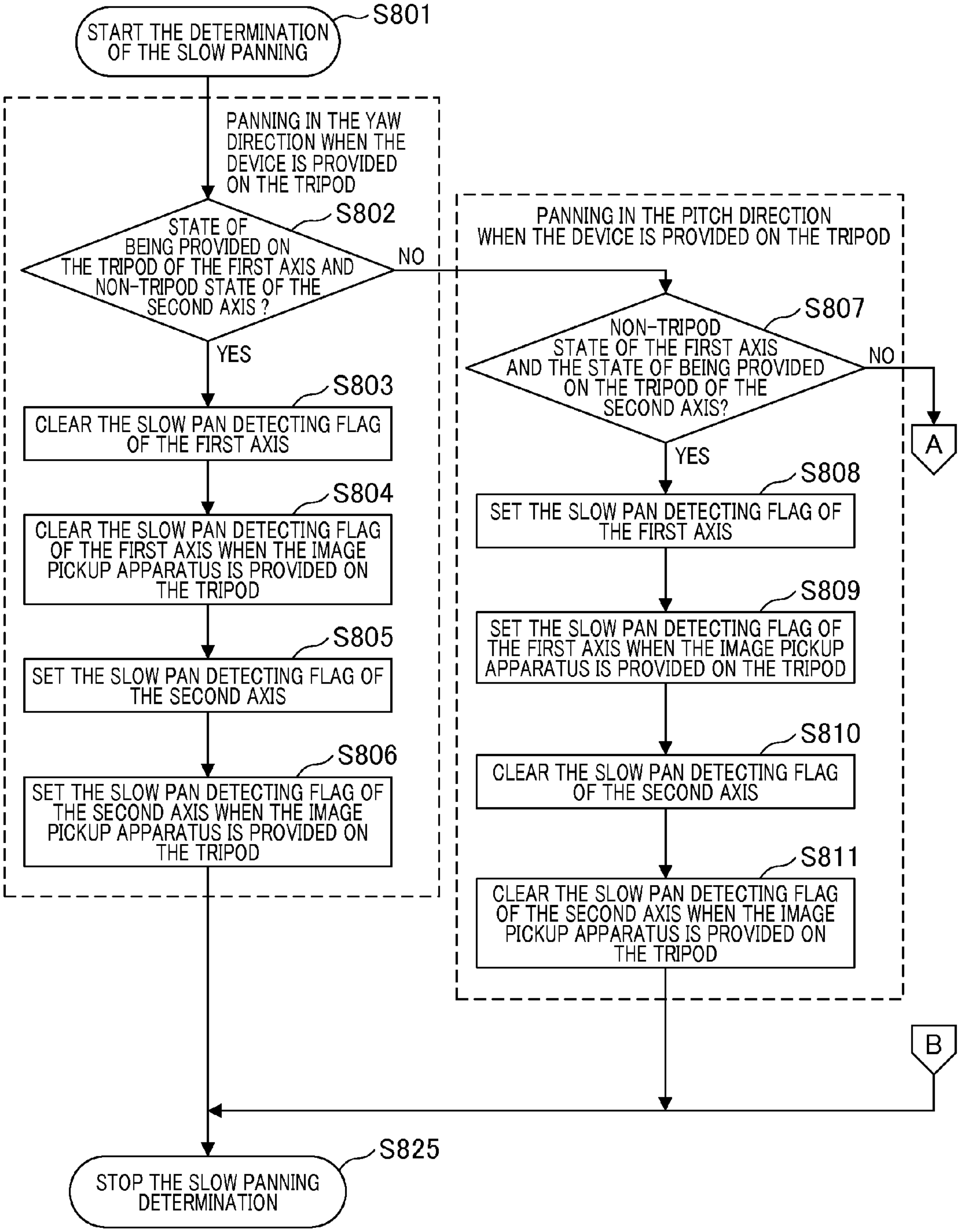
FIGS. 8A and 8B are a flow chart illustrating an exemplary processing for detecting a slow panning.
Figure 8B:
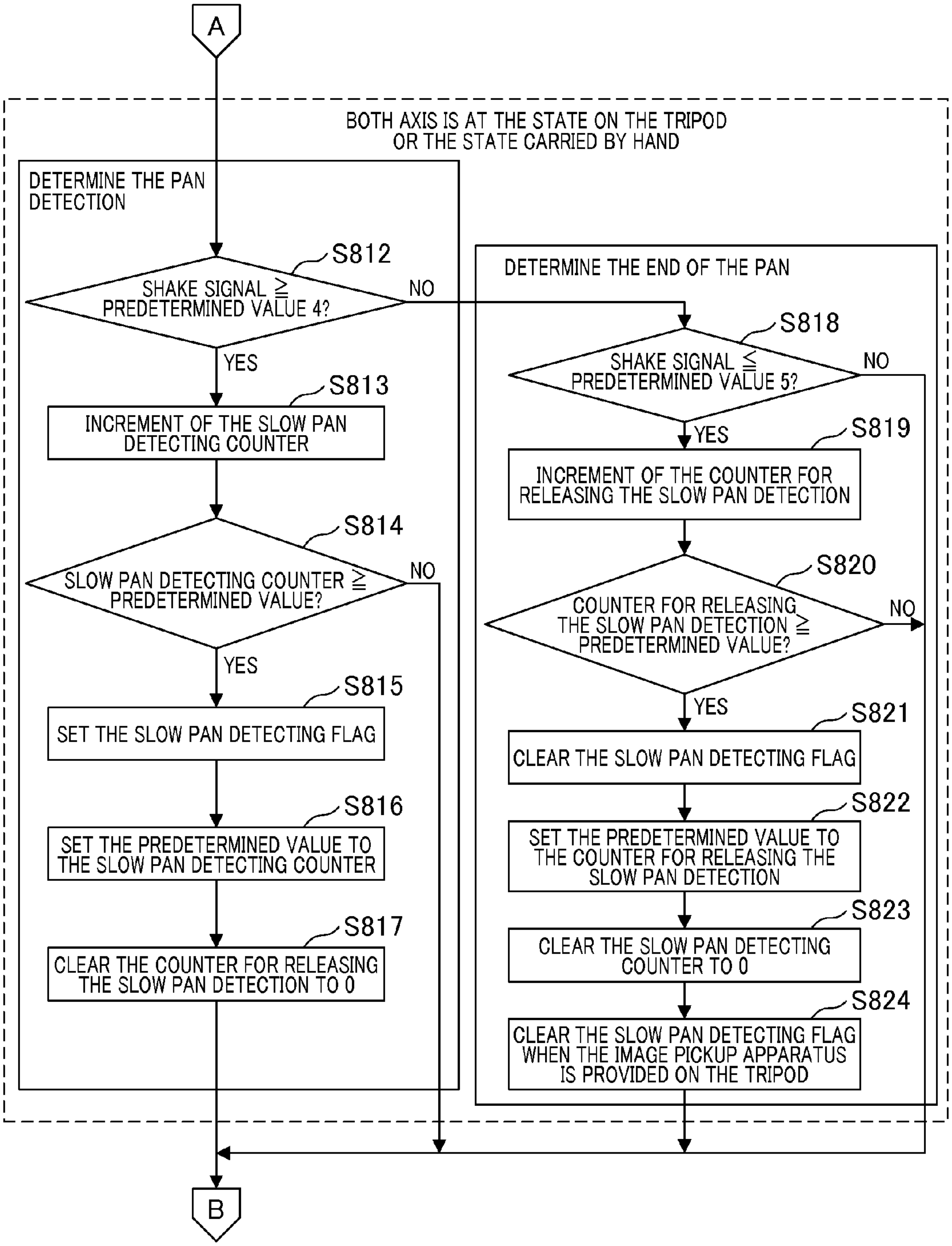

Next, a description will be given of a method for detecting a slow panning referring to the flowchart in FIGS. 8A and 8B. In the processing that determines the pan detection, the same processing at a constant period is carried out to a first axis and a second axis separately. For example, a direction about the first axis is set to a pitch direction and that about the second axis is set to a yaw direction.

Firstly, when the processing that determines the slow panning is started (S801), the shake information and the determination reference value is used to determine whether the image pickup apparatus provided on the tripod is in a static state (hereinafter referred to as "a state provided on the tripod") or not (S802). The state other than the state provided on the tripod is called a "non-tripod state". If the state of the image pickup apparatus is determined to be in the state provided on the tripod for the first axis and the non-tripod state for the second axis to the regular position of the image pickup apparatus, the processing proceeds to S803. However, if the condition of the determination is not satisfied, the processing proceeds to S807.

In S803, the slow pan detecting flag of the first axis that is a fifth flag is cleared, and the slow pan detecting flag of the first axis that is a sixth flag when the image pickup apparatus is provided on the tripod is cleared in S804. In addition, the slow pan detecting flag of the second axis that is a seventh flag is set in S805. The slow pan detecting flag of the second axis that is an eighth flag when the image pickup apparatus is provided on the tripod is set in S806. And then, the determination of the slow panning is stopped (S825).

In S807, it is determined whether or not the state of the image pickup apparatus is in the state provided on the tripod for the second axis and in the non-tripod state for the first axis. If the condition of the determination is satisfied, the processing proceeds to S808. However, if the condition is not satisfied, the processing proceeds to S812. In S808, the slow pan detecting flag of the first axis is set, and the slow pan detecting flag of the first axis when the image pickup apparatus is provided on the tripod is set in S809. In addition, the slow pan detecting flag of the second axis is cleared in S810 and the slow pan detecting flag of the second axis when the image pickup apparatus is provided on the tripod is cleared in S811 to stop the determination of the slow panning (S825).

In S802 and S807, if it is not determined that one axis is in the state provided on the tripod and the other axis is panning state, the pan/tilt determination unit 504 determines that both axes are in the state provided on the tripod or the photographing state when the user holds the apparatus by the hand and the processing proceeds to S812. In S812, the level of the shake signal is compared to the predetermined value 4 and it is determined whether or not the level is greater than or equal to the predetermined value 4. If the level of the shake signal is greater than or equal to the predetermined value 4, the panning state is determined that has a possibility to be slow and delayed and then, the processing proceeds to S813. If the level is less than the predetermined value 4, the processing proceeds to S818.

In S813, the value of the counter for detecting the slow pan is added to 1 (increment). Next, it is determined whether or not the value of the counter for detecting the slow pan is greater than or equal to the predetermined value (threshold value) or not (S814). If the value of the counter for detecting the slow pan is less than the predetermined value, the processing stops the determination of the slow panning (S825). Also, if the value of the counter for detecting the slow pan is greater than or equal to the predetermined value, the processing proceeds to S815. In this case, it is determined that a shake occurs in turn during the predetermined period, and the slow pan detecting flag is set (S815). The predetermined value is set to the slow pan detecting counter (S816). In addition, the value of the counter for releasing the slow pan detection is cleared to 0 (S817) to prepare for the clearing of the slow pan detecting flag, and then the determination of the slow panning is stopped (S825).

On the other hand, the S818 determines whether the level of the shake signal is less than or equal to the predetermined value 5 or not. If the condition of the determination is not satisfied, the shake of the image pickup apparatus is large and the slow panning is not determined to be stopped and then, the processing proceeds to S825. Also, if the level of the shake signal is less than or equal to the predetermined value 5, the processing proceeds to S819. In this case, the incrementing of the counter for releasing the slow pan detection is performed (S819). Next, it is determined whether or not the value of the counter for releasing the slow pan detection is greater than or equal to the predetermined value (S820). If the condition of the determination is not satisfied, the processing proceeds to S825 to be stopped. Also, if the condition of the determination is satisfied, the shake is determined to be small in series during the predetermined period and the processing proceeds to S821 to clear the slow pan detecting flag. In addition, the predetermined value is set to the counter for releasing the slow pan detection in S822 to clear the value of the counter of the slow pan detection to 0 (S823). In S824, the slow pan detecting flag when the image pickup apparatus is provided on the tripod is cleared to stop the processing for the determination of the slow panning.

Accordingly, the determination of the slow panning sets the flag if the large shake signal greater than or equal to the predetermined value 4 is detected in series during the predetermined time. Also, if the state of the shake signal continues to be in the state less than or equal to the predetermined value 5 in series during the predetermined time, the flag is cleared. The predetermined value 4 used in the determination of the panning detection and the predetermined value 5 used in the determination of the release of the panning detection satisfy the relationship "the predetermined value 4> the predetermined value 5" therebetween.

The panning operation at the state provided on the tripod has a more noticeable swing-back immediately after the panning than the state of being carried by hand since the image pickup apparatus in the state provided on the tripod is not at the shake state. The above case may be too late to detect the panning at the state provided on the tripod determined by the shake state of the predetermined time as with the state of being carried by hand. So, if one axis is at the state provided on the tripod and the panning operation is performed on the other axis, that case is immediately determined to be the slow panning. Thereby, the swing-back due to the panning at the state provided on the tripod can be suppressed. Note that the determination for detecting the slow tilting and the determination for the end of the detection of the slow tilting are performed as described above.

Figure 5:
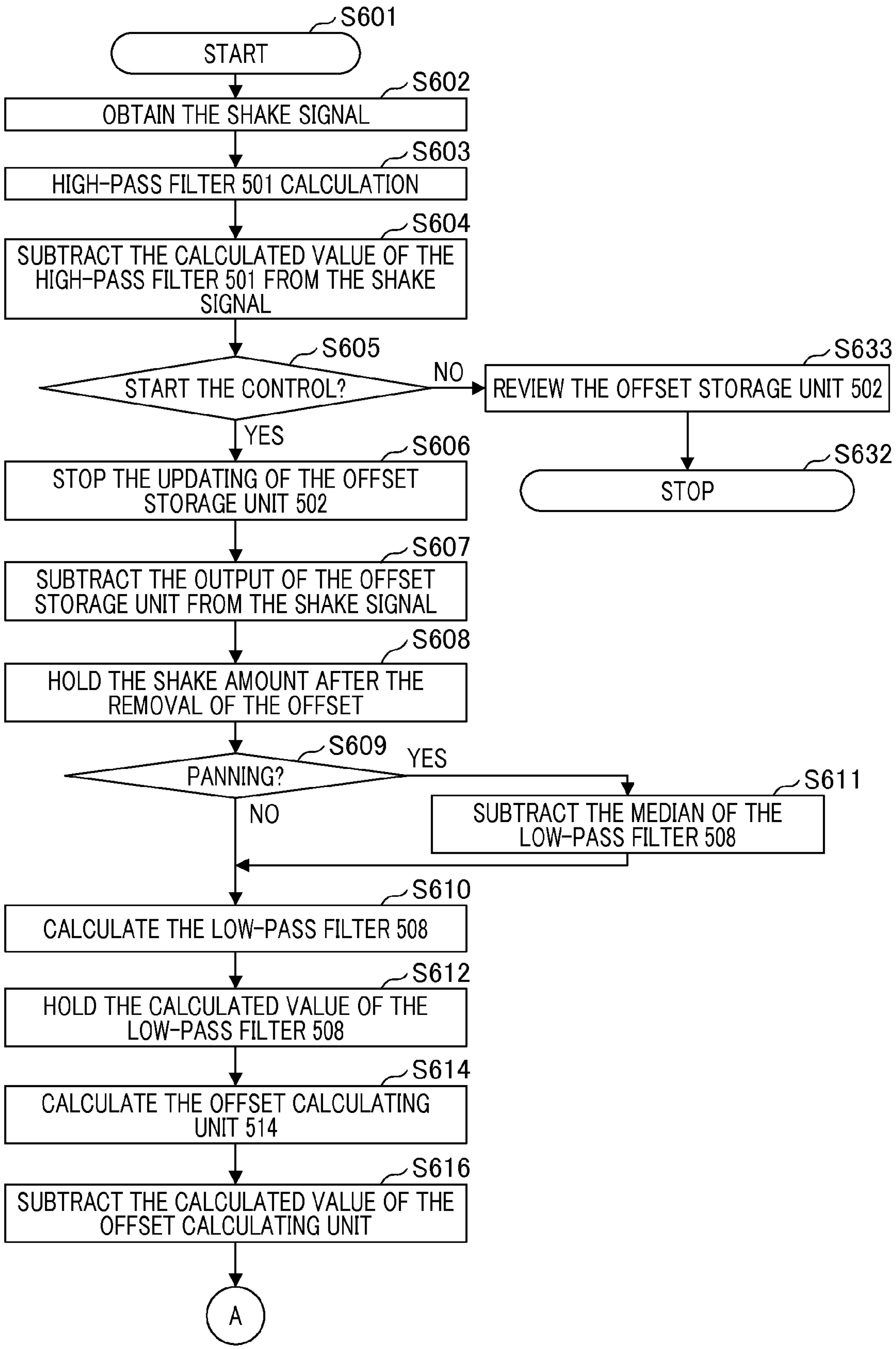
FIG. 5 is a flow chart illustrating a first half of a processing of a shake correction control unit.
Figure 6:
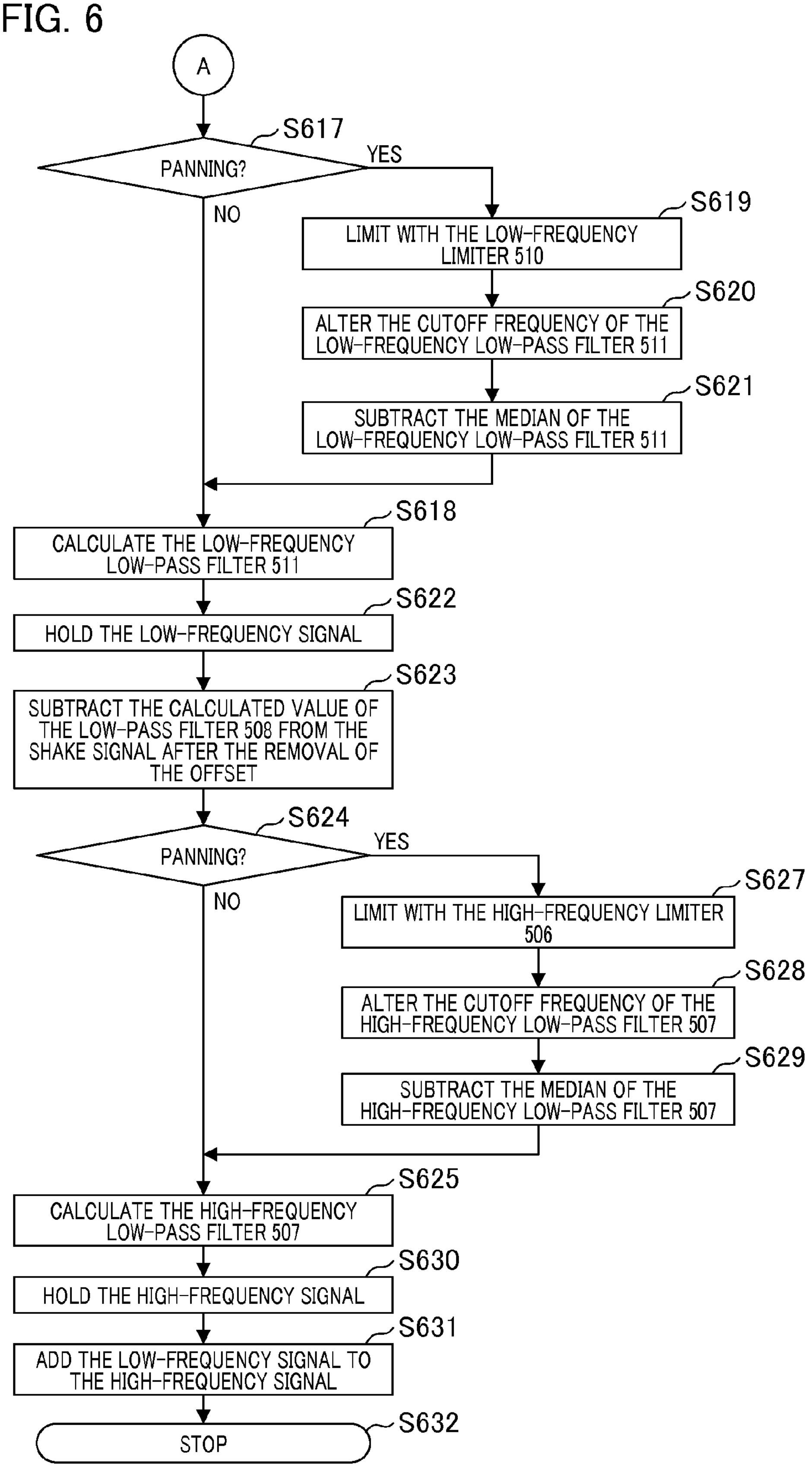
FIG. 6 is a flow chart illustrating the processing of the shake correction control unit continued from FIG. 5.

Next, a description will be given of calculations for the shake correction of the low-frequency and the high-frequency at the fast panning and the slow panning referred to in FIGS. 4, 5, and 6. The calculations for controlling the shake correction are performed at a constant period.

When the processing is started (S601), the HPF 501 obtains the shake signal from the shake sensor 201 (S602) and removes the low-frequency components thereof (S603). Next, the subtracting unit 517 subtracts the output of the HPF 501 from the shake signal (S604) to calculate the offset components of the low-pass in the shake signal. In S605, the processing determines whether or not anti-shake control (the control of the image shake correction) is started. If the anti-shake control is prior to the start, the processing proceeds to S633, and the value of the offset components of the low-pass calculated in S604 is held in the offset storage unit 502 to update the value. Then, the processing is stopped.

If the anti-shake control is started in S605, the processing proceeds to S606. In this case, the value of the offset components of the low-pass calculated in S604 is held in the offset storage unit 502, and the updating is stopped. With this manner, the offset components at the start of the control can be held as a fixed value. Next, the subtracting unit 518 subtracts the offset value stored in the offset storage unit 502 from the shake signal (S607), and holds the value after the removal of the offset (S608). In other words, since the offset calculation of the shake signal is stopped, a shake signal for which the low-pass components have not been removed by the HPF 501 is used in the image shake correction. Thereby, the operation of the swing-back due to the digital filter calculation with low cut-off frequency can be suppressed.

The pan/tilt determination unit 504 determines whether or not the image pickup apparatus is in the panning or the tilting (S609). Hereinafter, the description will be given of a panning determination as an example (more specifically, refer FIG. 6 to FIG. 8B). If the image pickup apparatus is determined to be panning, the processing proceeds to S611, and if it is not determined to be panning, the processing proceeds to S610.

In S611, the pan/tilt determination unit 504 subtracts the predetermined value from the intermediate value of the LPF 508. This subtraction is done to suppress the excessive increase of the intermediate value of the LPF 508 to the large shake during a panning operation. Then, the LPF 508 performs the calculation (S610) and holds the calculated value (S612) to extract the low-frequency components of the shake amount. Next, the offset calculating unit 514 calculates an offset amount so as not to generate the offset at an input terminal of the low-frequency LPF 511 (S614). The subtracting unit 519 subtracts the offset amount from the low-frequency components of the shake amount that is the output of the LPF 508 (S616). And then, the processing proceeds to S617 in FIG. 6.

Next, in t S617, the pan/tilt determination unit 504 determines again whether or not the image pickup apparatus is panning. If the image pickup apparatus is panning, the processing proceeds to S619. If the image pickup apparatus is not panning, the processing proceeds to S618. In S619, the low-frequency limiter 510 limits the input to the low-frequency LPF 511 so as not to exceed or be equal to the predetermined value. The pan/tilt determination unit 504 changes the cut-off frequency of the low-frequency LPF 511 and sets it to be high so as not to cause the correcting lens 103 to be out of the movable range based on the distance between the target position and a driving center position of the correcting lens 103 (S620). In addition, the pan/tilt determination unit 504 subtracts the predetermined value from the intermediate value of the low-frequency LPF 511 and performs the calculation for suppressing the increase of the intermediate value (S621).

In S618, the low-frequency LPF 511 performs the calculation and holds the result of the calculation (S622), and calculates the target position of the correcting lens 103 to the shake amount of the low-frequency. Next, the calculated value of the LPF 508 is subtracted from the shake amount held in S608 and S612 after the removal of the offset (S623) to extract the high-frequency components of the shake amount. In S624, the pan/tilt determination unit 504 determines whether the image pickup apparatus is panning or not. If the image pickup apparatus is panning, the processing proceeds to S627. If the image pickup apparatus is not panning, the processing proceeds to S625.

In S627, the high-frequency limiter 506 limits the input to the high-frequency LPF 507. The pan/tilt determination unit 504 changes the cut-off frequency of the high-frequency LPF 507 to the high-frequency side to prevent the correcting lens 103 from being outside of the movable range based on the distance between the target position and the driving center position of the correcting lens 103 (S628). In addition, the pan/tilt determination unit 504 subtracts the predetermined value from the intermediate value of the high-frequency LPF 507 to perform the calculation for suppressing the increase of the intermediate value (S629). In S625, the high-frequency LPF 507 performs the calculation and holds the result of the calculation (S630). The target position of the correcting lens 103 to the shake amount of the high-frequency is calculated. In S631, the adding unit 520 adds the target position of the correcting lens 103 for the shake amount of the high-frequency to the target position of the correcting lens 103 for the shake amount of the low-frequency that are held in the S622 and 630 respectively. Accordingly, a final target position of the correcting lens is calculated to stop the processing in S632.

The feedback control is carried out as the position of the correcting lens 103 follows the target position calculated in this manner to remove the influence of the hand shaking or the like applied to the image pickup apparatus. The cut-off frequency of the LPF 508 for dividing the shake signal by the frequency is determined so that the frequency band significantly influenced by the hand shaking is included in the high-frequency side. For example, if the shake signal is mainly included in the frequency with approximately 3 Hz to approximately 5 Hz, the cut-off frequency is set to less than or equal to 3 Hz.

The present embodiment compares the speed of the panning (or the tilting) to the threshold value and detects the large and fast panning greater than the threshold value and the slow panning less than or equal to the threshold value separately to change the content of the processing in the filter calculation depending on the result of the detection. Also, the shake signal is divided into the low-frequency and the high-frequency to process the shake of the low-frequency and that of the high-frequency separately with respect to the speed condition of each panning in the two types of the detections to calculate the target position of the correcting lens. If the fast panning is processed, the target values of the shake correcting lens for both the low-frequency and the high-frequency are processed to converge on a predetermined value (for example, 0 or approximately 0). The target positions of the correcting lens for both the low-frequency and the high-frequency are centered about the movable range. And then, an integral calculation is performed to calculate a shake angle signal that is the target position of the correcting lens from the shake signal (angular velocity signal). The calculation at the high-frequency side is started faster than that of the low-frequency side to allow the time during which the shake correction immediately after the panning is not performed to be short and be capable of suppressing the swing-back due to the panning.

In contrast, if the panning speed is less than or equal to the threshold value, the target position of the correcting lens is caused to converge to the predetermined value only in the low-frequency at which the correcting lens is easily driven out of the drivable range. In this case, the target position of the high-frequency according to the correcting lens is not controlled so as to converge. The continuation of the shake correction at the high-frequency side can suppress the reduction of the effect for the image shake correction during panning. Also, the panning during the photographing in which the camera is carried by hand has a method for determining the slow panning different from that of the static state in which the camera is provided on the tripod (the state provided on the tripod or the like). Accordingly, the above processing can reduce the change of the photographing image due to the swing-back after the panning operation and output the image without a feeling of discomfort in the state provided on the tripod or the like that has noticeable swing-back.

According to the present embodiment, the image shake correcting device can realize excellent image shake correction if the large shake occurs due to the panning operation or the like. Note that, in the present embodiment, the description has been given of an example of dividing the shake detection signal into two types of components, the high-frequency components and the low-frequency components. However, this invention can be adapted to a configuration for dividing the shake detection signal into frequency components greater than or equal to 3.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-257050, filed on Dec. 12, 2013, which is hereby incorporated by reference herein in its entirety.

What is claimed is:

1. An image shake correcting device for correcting an image shake by a drive of a correcting unit, the image shake correcting device comprising:

a processor that executes a computer program stored in a memory to control the image shake correcting device to function as units comprising:

(a) a dividing unit configured to divide a detection signal output by a shake detecting unit into a plurality of frequency components; and (b) a controlling unit configured to (1) detect a speed of panning or tilting, (2) independently change, for each of the plurality of frequency components based on the detected speed, a respective cut-off frequency of a filter calculation or a respective intermediate value calculated by the filter calculation, and (3) combine signals obtained by performing the filter calculation to generate a control signal of the correcting unit, if the panning or the tilting is determined from the detection signal, wherein the dividing unit divides the detection signal into a low frequency component and a high frequency component, and wherein the controlling unit comprises:

(a) a determining unit configured to determine the speed of the panning or the tilting;

(b) a first low pass filter having a variable converging time constant of the filter calculation while integrating the high frequency component;

(c) a second low pass filter having the variable converging time constant of the filter calculation while integrating the low frequency component; and (d) a combining unit configured to add output signals of the first low pass filter and the second low pass filter of which the cut off frequency or the intermediate value is changed by the speed of the panning or the tilting determined by the determining unit, and output the control signal of a target position of the correcting unit.

2. The image shake correcting device according to claim 1, wherein the dividing unit comprises:

(a) a third low-pass filter for extracting the low-frequency component; and (b) a subtracting unit configured to subtract the low-frequency component extracted by the third low-pass filter from the detection signal and output the high-frequency component.

3. The image shake correcting device according to claim 2, wherein the determining unit (1) compares the speed of the panning or the tilting with a threshold value and (2) changes the filter calculation depending on whether or not the speed is greater than the threshold value.

4. The image shake correcting device according to claim 3, wherein, if the speed of the panning or the tilting is greater than the threshold value, the controlling unit (1) causes target positions of the correcting unit for a low-frequency and a high-frequency to converge and (2) calculates the target position of the correcting unit for the high-frequency before calculating that for the low-frequency if the panning or the tilting is stopped.

5. The image shake correcting device according to claim 3, wherein if the speed of the panning or the tilting is equal to or less than the threshold value, the controlling unit (1) causes a target position of the correcting unit for a low-frequency to converge and (2) does not control the converging of a target position of the correcting unit for a high-frequency.

6. The image shake correcting device according to claim 3, further comprising a state determining unit configured to determine whether or not the device is in a static state based on the detection signal, wherein the controlling unit changes a determination condition of the panning or the tilting by an output of the state determining unit.

7. The image shake correcting device according to claim 6, wherein if the state determining unit determines that the device is in the static state at least in a direction about a first axis of a shake direction and is not in the static state in a direction about the second axis different from the first axis, the controlling unit determines that the device is in the panning or the tilting state in the direction about the second axis to converge the target position of the correcting unit for a low-frequency.

8. An optical apparatus comprising the image shake correcting device according to claim 1.

9. An image pickup apparatus comprising the image shake correcting device according to claim 1.

10. The image pickup apparatus according to claim 9, wherein the correcting unit is a correcting lens movable in a direction different from an optical axis of a photographing optical system, and wherein the image pickup apparatus further comprises a position controlling unit configured to obtain the detection signal of the shake detecting unit to determine the target position of the correcting lens and to perform a feedback control for converging a position of the correcting lens to the target position.

11. The image pickup apparatus according to claim 10, further comprising a tripod determining unit configured to obtain the detection signal of the shake detecting unit and to determine whether or not the image pickup apparatus is in the static state while provided in a tripod, wherein, if the tripod determining unit determines that the image pickup apparatus is not in the static state in a pitch direction and a yaw direction, the controlling unit limits an input of the filter calculation.

12. A control method for correcting an image shake by an image shake correcting device with a drive of a correcting unit, the method comprising:

dividing, by a dividing unit, a detection signal output by a shake detecting unit into a plurality of frequency components;

detecting, by a controlling unit, a speed of panning or tilting, and independently changing, for each of the plurality of frequency components based on the detected speed, a respective cut-off frequency of a filter calculation or a respective intermediate value calculated by the filter calculation, if the controlling unit obtains the detection signal and determines the panning or the tilting; and combining, by the controlling unit, signals obtained by performing the filter calculation, and generating a control signal of the correcting unit, wherein the dividing divides the detection signal into a low frequency component and a high frequency component, wherein the controlling unit comprises (a) a first low pass filter having a variable converging time constant of the filter calculation while integrating the high frequency component, and (b) a second low pass filter having the variable converging time constant of the filter calculation while integrating the low frequency component, and wherein the combining comprises (a) adding output signals of the first low pass filter and the second low pass filter of which the cut off frequency or the intermediate value is changed by the determined speed of the panning or the tilting, and (b) outputting the control signal of a target position of the correcting unit.

13. An image shake correcting device for correcting an image shake by a drive of a correcting unit, the image shake correcting device comprising:

a processor that executes a computer program stored in a memory to control the image shake correcting device to function as units comprising:

(a) a dividing unit configured to divide a detection signal output by a shake detecting unit into a plurality of frequency components; and (b) a controlling unit configured to (1) detect a speed of panning or tilting, (2) independently change, for each of the plurality of frequency components based on the detected speed, a respective cut off frequency of a filter calculation or a respective intermediate value calculated by the filter calculation, and (3) combine signals obtained by performing the filter calculation to generate a control signal of the correcting unit, if the panning or the tilting is determined from the detection signal, wherein, if the speed of the panning or the tilting is greater than a threshold value, the controlling unit (1) causes target positions of the correcting unit for a low frequency and a high frequency to converge and (2) calculates the target position of the correcting unit for the high frequency before calculating that for the low frequency if the panning or the tilting is stopped.

14. The image shake correcting device according to claim 13, wherein the dividing unit divides the detection signal into a low frequency component and a high frequency component, and wherein the controlling unit comprises:

(a) a determining unit configured to determine the speed of the panning or the tilting;

(b) a first low pass filter having a variable converging time constant of the filter calculation while integrating the high frequency component;

(c) a second low pass filter having the variable converging time constant of the filter calculation while integrating the low frequency component; and (d) a combining unit configured to add output signals of the first low pass filter and the second low pass filter of which the cut off frequency or the intermediate value is changed by the speed of the panning or the tilting determined by the determining unit, and output the control signal of a target position of the correcting unit.

15. The image shake correcting device according to claim 13, wherein the dividing unit comprises:

(a) a third low pass filter for extracting the low frequency component; and (b) a subtracting unit configured to subtract the low frequency component extracted by the third low pass filter from the detection signal and output the high frequency component.

16. The image shake correcting device according to claim 15, wherein the determining unit (1) compares the speed of the panning or the tilting with a threshold value and (2) changes the filter calculation depending on whether or not the speed is greater than the threshold value.

17. The image shake correcting device according to claim 16, wherein if the speed of the panning or the tilting is equal to or less than the threshold value, the controlling unit (1) causes the target position of the correcting unit for the low frequency to converge and (2) does not control the converging of the target position of the correcting unit for the high frequency.

18. The image shake correcting device according to claim 16, further comprising a state determining unit configured to determine whether or not the device is in a static state based on the detection signal, wherein the controlling unit changes a determination condition of the panning or the tilting by an output of the state determining unit.

19. The image shake correcting device according to claim 18, wherein if the state determining unit determines that the device is in the static state at least in a direction about a first axis of a shake direction and is not in the static state in a direction about the second axis different from the first axis, the controlling unit determines that the device is in the panning or the tilting state in the direction about the second axis to converge the target position of the correcting unit for the low frequency.

20. An optical apparatus comprising the image shake correcting device according to claim 13.

21. An image pickup apparatus comprising the image shake correcting device according to claim 13.

22. The image pickup apparatus according to claim 21, wherein the correcting unit is a correcting lens movable in a direction different from an optical axis of a photographing optical system, and wherein the image pickup apparatus further comprises a position controlling unit configured to obtain the detection signal of the shake detecting unit to determine the target position of the correcting lens and to perform a feedback control for converging a position of the correcting lens to the target position.

23. The image pickup apparatus according to claim 22, further comprising a tripod determining unit configured to obtain the detection signal of the shake detecting unit and to determine whether or not the image pickup apparatus is in the static state while provided in a tripod, wherein, if the tripod determining unit determines that the image pickup apparatus is not in the static state in a pitch direction and a yaw direction, the controlling unit limits an input of the filter calculation.

24. A control method for correcting an image shake by an image shake correcting device with a drive of a correcting unit, the method comprising:

dividing, by a dividing unit, a detection signal output by a shake detecting unit into a plurality of frequency components;

detecting, by a controlling unit, a speed of panning or tilting, and independently changing, for each of the plurality of frequency components based on the detected speed, a respective cut off frequency of a filter calculation or a respective intermediate value calculated by the filter calculation, if the controlling unit obtains the detection signal and determines the panning or the tilting; and combining, by the controlling unit, signals obtained by performing the filter calculation, and generating a control signal of the correcting unit, wherein, if the speed of the panning or the tilting is greater than a threshold value, the controlling unit:

(1) causes target positions of the correcting unit for a low frequency and a high frequency to converge; and (2) calculates the target position of the correcting unit for the high frequency before calculating that for the low frequency if the panning or the tilting is stopped.

* * * * *